(12) United States Patent
Hemstock (10) Patent No.: US 9,327,214 B2
(45) Date of Patent: May 3, 2016

(54) DESANDING APPARATUS AND A METHOD OF USING SAME

(71) Applicant: SPECIALIZED DESANDERS INC., Calgary (CA)

(72) Inventor: Christopher Hemstock, Calgary (CA)

(73) Assignee: SPECIALIZED DESANDERS INC., Calgary (CA)

(*) Notice: Subject to any disclaimer, the term of this patent is extended or adjusted under 35 U.S.C. 154(b) by 211 days.

(21) Appl. No.: 14/251,365

(22) Filed: Apr. 11, 2014

(65) Prior Publication Data

US 2014/0216256 A1 Aug. 7, 2014

Related U.S. Application Data

(63) Continuation-in-part of application No. 13/372,291, filed on Feb. 13, 2012, now Pat. No. 8,945,256.

(51) Int. Cl.
| | |
|---|---|
| *B01D 50/00* | (2006.01) |
| *B01D 19/00* | (2006.01) |
| *B01D 21/00* | (2006.01) |
| *B01D 21/24* | (2006.01) |
| *B01D 47/02* | (2006.01) |
| *E21B 27/00* | (2006.01) |

(52) U.S. Cl.
CPC ........ *B01D 19/0042* (2013.01); *B01D 21/0003* (2013.01); *B01D 21/2405* (2013.01); *B01D 21/2483* (2013.01); *B01D 21/2494* (2013.01); *B01D 47/02* (2013.01); *E21B 27/00* (2013.01); *B01D 2221/04* (2013.01)

(58) Field of Classification Search
CPC ........... B01D 19/0042; B01D 21/2405; B01D 21/2494; B01D 21/2483; B01D 21/0003; B01D 47/02; B01D 2221/04; B01D 45/02; B01D 35/30; B01D 21/0042; E21B 27/00; E21B 43/34

USPC ......... 55/319; 210/519, 539, 540, 541, 532.1, 210/537; 95/253; 96/182, 183, 184
See application file for complete search history.

(56) References Cited

U.S. PATENT DOCUMENTS

| | | | |
|---|---|---|---|
| 1,494,670 | A | 5/1924 | Delaney |
| 1,601,611 | A | 9/1926 | Downey |

(Continued)

FOREIGN PATENT DOCUMENTS

| | | |
|---|---|---|
| CA | 2041479 | 4/1998 |
| CA | 2433741 | 7/2003 |

(Continued)

OTHER PUBLICATIONS

PCT/CA2012/050915—International Search Report.

(Continued)

*Primary Examiner* — Dung H Bui
(74) *Attorney, Agent, or Firm* — Parlee McLaws LLP; Sean Goodwin (57) ABSTRACT

A desanding system has an elongated vessel that is tilted at a non-zero inclination angle. The vessel has an upper end that tilts downwardly towards a distal end and has a diverging bounding wall so as to define a top wall having a first inclination angle and a bottom wall having a second inclination angle greater than the first inclination angle. A fluid inlet interface at the vessel's upper end discharges a gas stream, having entrained liquids and particulates, into a freeboard portion formed adjacent the top wall above a gas/liquid interface formed below the fluid outlet. A cross-sectional area of the freeboard portion causes precipitation of the entrained liquids and particulates therefrom for collection in a belly storage portion formed below the interface. A desanded gas stream, being free of a substantial portion of the particulates is removed from the vessel through a fluid outlet adjacent the distal base.

18 Claims, 5 Drawing Sheets

(56) References Cited

U.S. PATENT DOCUMENTS

| | | | |
|---|---|---|---|
| 1,702,612 A | 2/1929 | Morse | |
| 1,851,030 A | 3/1932 | Adams | |
| 2,049,068 A | 7/1936 | Loupe | |
| 2,058,044 A | 10/1936 | Spencer | |
| 2,076,380 A * | 4/1937 | Marsh | B01D 17/0208 210/532.1 |
| 2,206,835 A | 7/1940 | Combs | |
| 2,228,401 A | 1/1941 | Pressler | |
| 2,547,190 A | 4/1951 | Wilson | |
| 2,610,697 A | 9/1952 | Lovelady | |
| 2,664,963 A | 1/1954 | Lovelady | |
| 2,706,531 A | 4/1955 | Lovelady | |
| 2,751,998 A | 6/1956 | Glasgow | |
| 2,969,110 A * | 1/1961 | Jordan | B60K 15/00 123/516 |
| 3,255,571 A | 6/1966 | Walker et al. | |
| 3,273,318 A | 9/1966 | Meyer | |
| 3,310,109 A | 3/1967 | Marx | |
| 3,331,188 A | 7/1967 | Sinex | |
| 3,349,547 A * | 10/1967 | Hoipkemeier | B01D 47/00 210/342 |
| 3,363,404 A * | 1/1968 | Griffin, III | E21B 21/067 96/165 |
| 3,372,530 A * | 3/1968 | Zimmer | B01D 45/10 261/116 |
| 3,396,512 A | 8/1968 | McMinn | |
| 3,426,904 A | 2/1969 | Katsua | |
| 3,512,651 A * | 5/1970 | Laval, Jr. | B04C 5/103 209/727 |
| 3,553,940 A | 1/1971 | Piner, Jr. | |
| 3,574,096 A | 4/1971 | Carlstedt | |
| 3,593,500 A * | 7/1971 | Ritland | F22B 37/266 122/483 |
| 3,623,608 A * | 11/1971 | Waterman | B01D 17/0205 210/101 |
| 3,852,192 A | 12/1974 | Fassell | |
| 3,876,401 A * | 4/1975 | Sturgill | B01D 46/00 55/481 |
| 4,073,734 A | 2/1978 | Lowrie | |
| 4,115,279 A | 9/1978 | Toft | |
| 4,122,009 A | 10/1978 | Tao | |
| 4,208,196 A | 6/1980 | Coggins | |
| 4,238,333 A | 12/1980 | Tidwell | |
| 4,257,895 A | 3/1981 | Murdock | |
| 4,266,694 A * | 5/1981 | Hehl | B29C 45/18 222/167 |
| 4,297,116 A * | 10/1981 | Cusick | B01D 46/002 55/319 |
| 4,400,271 A | 8/1983 | Lunceford | |
| 4,539,023 A | 9/1985 | Boley | |
| 4,604,196 A | 8/1986 | Lowrie et al. | |
| 4,617,031 A | 10/1986 | Suh | |
| 4,673,500 A | 6/1987 | Hoofnagle et al. | |
| 4,721,565 A | 1/1988 | Carroll | |
| 4,778,494 A | 10/1988 | Patterson | |
| 4,939,817 A | 7/1990 | weber | |
| 4,975,205 A | 12/1990 | Sloan | |
| 5,064,448 A | 11/1991 | Choi | |
| 5,173,194 A | 12/1992 | Hering | |
| 5,245,057 A | 9/1993 | Shirtum | |
| 5,295,537 A | 3/1994 | Trainer | |
| 5,326,474 A | 7/1994 | Adams et al. | |
| 5,415,776 A | 5/1995 | Homan | |
| 5,500,039 A | 3/1996 | Mori | |
| 5,522,999 A | 6/1996 | Broussard | |
| 5,575,909 A | 11/1996 | Foster | |
| 5,582,271 A | 12/1996 | Mielo | |
| 5,599,507 A | 2/1997 | Shaw | |
| 5,827,357 A | 10/1998 | Farion | |
| 5,837,152 A * | 11/1998 | Komistek | B01D 17/00 210/519 |
| 5,865,992 A | 2/1999 | Edmondson | |
| 5,900,137 A | 5/1999 | Homan | |
| 5,928,519 A | 7/1999 | Homan | |
| 6,099,742 A * | 8/2000 | Komistek | B01D 17/00 210/180 |
| 6,099,743 A | 8/2000 | Pedersen | |
| 6,119,779 A | 9/2000 | Gipson et al. | |
| 6,158,512 A | 12/2000 | Unsgaard | |
| 6,189,617 B1 | 2/2001 | Sorhus et al. | |
| 6,214,092 B1 | 4/2001 | Odom et al. | |
| 6,214,220 B1 | 4/2001 | Favret | |
| 6,269,880 B1 | 8/2001 | Landry | |
| 6,409,808 B1 | 6/2002 | Chamberlain | |
| 6,419,730 B1 | 7/2002 | Chavez | |
| 6,458,191 B1 | 10/2002 | Lingelem et al. | |
| 6,537,458 B1 | 3/2003 | Polderman | |
| 6,709,500 B1 * | 3/2004 | West | B01D 17/0211 210/512.2 |
| 6,783,683 B2 | 8/2004 | Collings | |
| 6,821,322 B2 | 11/2004 | Milia | |
| 6,983,852 B2 | 1/2006 | Hemstock et al. | |
| 7,270,690 B1 * | 9/2007 | Sindel | B01D 45/08 55/320 |
| 7,429,332 B2 | 9/2008 | Surjaatmadja et al. | |
| 7,614,389 B2 | 11/2009 | Ruckwied | |
| 7,785,400 B1 | 8/2010 | Worley | |
| 7,993,426 B2 * | 8/2011 | Fujita | B01D 45/06 122/483 |
| 8,308,959 B2 | 11/2012 | Noles, Jr. | |
| 8,337,603 B2 | 12/2012 | Akhras et al. | |
| 8,623,221 B1 | 1/2014 | Boyd et al. | |
| 8,657,896 B2 * | 2/2014 | Gouy | B01D 50/002 210/512.1 |
| 2002/0157997 A1 * | 10/2002 | Binsfeld | B01D 17/00 210/180 |
| 2002/0162806 A1 | 11/2002 | Komistek | |
| 2004/0011201 A1 * | 1/2004 | Stevens | C10G 1/045 95/262 |
| 2004/0074838 A1 | 4/2004 | Hemstock et al. | |
| 2004/0184976 A1 | 9/2004 | Pagani | |
| 2006/0037916 A1 * | 2/2006 | Trampler | B01D 43/00 422/128 |
| 2006/0289353 A1 * | 12/2006 | Hemstock | B01D 21/00 210/519 |
| 2007/0294987 A1 * | 12/2007 | Hunsinger | B01D 46/0005 55/486 |
| 2009/0134095 A1 * | 5/2009 | Hann | B01D 21/003 210/741 |
| 2010/0200521 A1 * | 8/2010 | Sarshar | B04C 3/00 210/787 |
| 2011/0078987 A1 | 4/2011 | Shishov et al. | |
| 2011/0199855 A1 | 8/2011 | Hanada | |
| 2011/0259836 A1 * | 10/2011 | Noles, Jr. | B01D 21/0045 210/800 |
| 2012/0024690 A1 * | 2/2012 | Betting | B01D 45/16 203/87 |
| 2013/0337166 A1 * | 12/2013 | Betting | F17D 1/05 427/230 |

FOREIGN PATENT DOCUMENTS

| | | |
|---|---|---|
| CA | 2407554 | 4/2004 |
| CA | 2646150 | 6/2009 |
| CA | 2799278 | 8/2013 |
| EP | 0208981 B1 | 3/1991 |
| GB | 773096 | 4/1957 |
| WO | 02063231 | 8/2002 |
| WO | 02070101 | 9/2002 |
| WO | 2009055291 | 4/2009 |
| WO | 2010034325 | 4/2010 |
| WO | 2013016952 | 2/2013 |

OTHER PUBLICATIONS

PCT/CA2014/051170 International Search Report and Written Opinion.

PCT/CA2014/050712 International Search Report and Written Opinion.

* cited by examiner

DESANDING APPARATUS AND A METHOD OF USING SAME

CROSS REFERENCE TO RELATED APPLICATIONS

This application is a continuation-in-part of the US Patent Publication No. US 2013/0206007 A1, filed on Feb. 13, 2012, and published on Aug. 15, 2013, the subject matter of which is incorporated fully herein by reference.

FIELD OF THE DISCLOSURE

The present disclosure generally relates to an apparatus and a method for removing particulates from multiphase fluid streams, and in particular, relates to an apparatus and a method for removing sands from multiphase fluid streams produced from an oil or gas well while minimizing the abrasion to the equipment involved.

BACKGROUND

Production from wells in the oil and gas industry often contains particulates such as sand. These particulates could be part of the formation from which the hydrocarbon is being produced, introduced from hydraulic fracturing, or fluid loss material from drilling mud or fracturing fluids, or from a phase change of produced hydrocarbons caused by changing conditions at the wellbore (Asphalt or wax formation). As the particulates are produced, problems occur due to abrasion and plugging of production equipment. In a typical startup after stimulating a well by fracturing, the stimulated well may produce sand until the well has stabilized, often lasting for several months after production commences. Other wells may produce sand for a much longer period of time.

Erosion of the production equipment is severe enough to cause catastrophic failure. High fluid stream velocities are typical and are even purposefully designed for elutriating particles up the well and to the surface. An erosive failure of this nature can become a serious safety and environmental issue for the well operator. A failure such as a breach of high pressure piping or equipment releases uncontrolled high velocity flow of fluid which is hazardous to service personnel. Releasing such fluid to the environment is damaging to the environment resulting in expensive cleanup and loss of production. Repair costs are also high.

In all cases, retention of particulates contaminates surface equipment and the produced fluids and impairs the normal operation of the oil and gas gathering systems and process facilities. Therefore, desanding devices are required for removing sand from the fluid stream. Due to the nature of the gases handled, including pressure and toxicity, all vessels and pressure piping in desanding devices must be manufactured and approved by appropriate boiler and pressure vessel safety authorities.

In one existing system, a pressurized tank ("P-Tank") is placed on the wellsite and the well is allowed to produce fluid and particulates. The fluid stream is produced from a wellhead and into a P-Tank until sand production ceases. The large size of the P-Tank usually restricts the maximum operating pressure of the vessel to something in the order of 1,000-2,100 kPa. In the case of a gas well, this requires some pressure control to be placed on the well to protect the P-Tank. Further, for a gas well, a pressure reduction usually is associated with an increase in gas velocity which in turn makes sand-laden wellhead effluent much more abrasive and places the pressure controlling choke at risk of failure. Another problem associated with this type of desanding technique is that it is only a temporary solution. If the well continues to make sand, the solution becomes prohibitively expensive. In most situations with this kind of temporary solution, the gas vapors are not conserved and sold as a commercial product.

Another known system includes employing filters to remove particulates. A common design is to have a number of fiber-mesh filter bags placed inside a pressure vessel. The density of the filter bag fiber-mesh is matched to the anticipated size of the particulates. Filter bags are generally not effective in the removal of particulates in a multiphase condition. Usually multiphase flow in the oil and gas operations is unstable. Large slugs of fluid followed by a gas mist are common. In these cases, the fiber bags become a cause of pressure drop and often fail due to the liquid flow therethrough. Due to the high chance of failure, filter bags may not be trusted to remove particulates in critical applications or where the flow parameters of a well are unknown. An additional problem with filter bags in most jurisdictions, is the cost associated with disposal. The fiber-mesh filter bags are considered to be contaminated with hydrocarbons and must be disposed of in accordance to local environmental regulation.

In Canadian Patent Number 2,433,741, issued Feb. 3, 2004 and in Canadian Patent Number 2,407,554, issued Jun. 20, 2006, both assigned to the Applicant of the subject patent application, a desander is disclosed having an elongate, horizontal vessel with an inlet at one end and an outlet at the other end. The outlet separated from the inlet by a downcomer flow barrier, such as a weir, adjacent the vessel's outlet or exit. The weir forms, and maintains, an upper freeboard portion having a cross-sectional area which is greater than that of the field piping from whence the fluid stream emanates for encouraging water and particulates to fall out of the freeboard portion. Water and particulates accumulate along a belly portion. The accumulation of particulates is along a substantial length of the elongate vessel increasing the difficulty of periodic manual removal of such accumulation using scraper rods and the like.

While Applicant has substantially maintained their elongated horizontal design virtually unchanged for years, there has been a desire to improve the ease with which the vessel can be cleaned and further improvement in separation efficiency. Further, due to the nature of the gases handled, including pressure and toxicity, all vessels and pressure piping must be manufactured and approved by appropriate boiler and pressure vessel safety authorities.

SUMMARY

Desanding apparatus is provided which is placed adjacent to a well's wellhead for intercepting a fluid stream flow prior to entry to equipment including piping, separators, valves, chokes and downstream equipment. The fluid stream can contain a variety of phases including liquid, gas and solids. In one embodiment, a pressure vessel is inserted in the flowstream by insertion into high velocity field piping extending from the wellhead. The vessel contains an upper freeboard portion having a cross-sectional area which is greater than that of the field piping from whence the fluid stream emanates. As a result, fluid stream velocity drops and particulates cannot be maintained in suspension. The freeboard portion is maintained through control of the angle of the desander, obviating the need for a downcomer of Applicant's own prior art horizontal desanders.

In a broad aspect, a desanding system receives a gas stream containing entrained liquid and particulates. The system comprises a vessel, elongated along a longitudinal axis and inclined from a horizontal at a non-zero inclination angle. The vessel has a fluid inlet, adjacent an upper end for discharging the gas stream into the vessel at an inlet velocity, and a fluid outlet, spaced along the longitudinal axis from, and lower than, the fluid inlet.

The vessel further has a gas/liquid interface at the fluid outlet, a belly storage portion formed below the interface, and a freeboard portion formed adjacent an upper portion of the vessel above the interface. The freeboard portion has a freeboard cross-sectional area which diminishes from the fluid inlet to the fluid outlet, wherein a freeboard velocity, adjacent the fluid inlet is less than the inlet velocity, the freeboard velocity being such that the entrained liquids and particulates fall out of the gas stream for collecting in the belly storage portion. A desanded gas stream flows out of the freeboard portion and out the fluid outlet, being free of a substantial portion of the particulates.

More preferably, a vessel of an embodiment of the present invention is incorporated in a desanding system to replace existing prior connective piping for a wellhead, the vessel being supported using structure to align the vessel with the wellhead piping and downstream equipment. The desander's fluid inlet and fluid outlet, associated with the inclined world of the desander, are adapted to connect to the orthogonal world of the connective piping.

In another broad aspect, a method for desanding a fluid stream, emanating from a wellhead and containing gas and entrained liquid and particulates, comprises providing an elongated vessel having a longitudinal axis which is inclined from the horizontal. The vessel has a fluid inlet adjacent an first end of the vessel and a fluid outlet spaced along the longitudinal axis from the fluid inlet; inclining the vessel at angle from a horizontal at a non-zero inclination angle so that the fluid outlet is lower that the fluid inlet for forming a freeboard portion above the fluid outlet. The fluid stream is discharging from the fluid inlet, into the vessel and substantially parallel to the longitudinal axis for establishing a liquid interface in a belly portion of the vessel, the belly portion being formed below the fluid outlet. Liquid and particulates are being directed along a trajectory in the freeboard portion of the vessel to intercept a substantial portion of the particulates at the liquid interface for storage in the belly portion. A desanded gas stream is recovered at the fluid outlet which is substantially free of particulates.

The inlet can be parallel or non-parallel with the longitudinal axis for enabling a trajectory to intercept the gas/liquid interface. The fluid stream can be introduced through a replaceable nozzle. The fluid inlet can be curved to align the inlet from the inclined desander and orthogonal piping from a wellhead.

In yet another broad aspect, there is provided a vessel having a distal end and a proximal end for removing particulates from a multiple-phase fluid stream containing gas, entrained liquid and particulates, the vessel comprising: a volume having a diverging bounding wall, a distal base, and an apex; the diverging bounding wall having a top wall at a first inclination angle and a bottom wall at a second inclination angle; the second inclination angle at a greater angle than the first inclination angle; a fluid inlet interface at the apex for receiving said fluid stream into the volume of the vessel; a fluid outlet on the top of the top wall, spaced from the fluid inlet interface; a horizontally extending freeboard interface separating a freeboard portion formed adjacent an upper portion of the vessel above the interface and a belly portion therebelow, the belly portion being bounded at its bottom by the bottom wall, the freeboard portion forming a freeboard cross-sectional area for a freeboard velocity of the fluid stream less than a fluid stream velocity at the fluid inlet interface; and an elongated flow path for receiving the fluid stream from the fluid inlet interface and directing the fluid stream to the fluid outlet; wherein said length of the elongated flow path and the freeboard velocity are such that an effective amount of the entrained liquid and particulates fall out of the fluid stream and particulates settle towards the bottom wall of the belly portion; and wherein a desanded gas stream flows out of the freeboard portion through the fluid outlet and is free of a substantial portion of the particulates.

The second inclination angle may be greater than the angle of repose of settled particulates. The top inclination angle may be inclusively between 2 and 20 degrees. The cross-sectional shape of the proximal base may be circular.

In some embodiments, the central axis may be perpendicular to the plane of the distal base. In some other embodiments, the central axis may be oblique to the distal base.

Applicable in all instances, at steady state, once the belly portion fills with liquid and in cases where liquid removal from the belly portion is less than the rate of incoming liquid, a mass balance of liquid in and out can be established in which case the incoming liquid co-exiting with the desanded gas.

The vessel may further comprise a lower discharge from the belly portion for discharging liquid and collected particulates. The discharge further comprises: an inlet valve adjacent and fluidly connected to the discharge; a particulate accumulation chamber; and a discharge valve, wherein the particulate accumulation chamber is sandwiched between the inlet valve and the discharge valve.

In some embodiments, the fluid inlet interface has a discharge end, and the discharge end is oriented for discharging the gas stream into the freeboard at an angle equal to the top inclination angle. The fluid inlet interface may further comprise a replaceable nozzle having a discharge end oriented for discharging the gas stream into the freeboard. The replaceable nozzle may be connected to the fluid inlet interface at a flange.

In some embodiments, the desanding system receives a gas stream emanating from a wellhead and the fluid inlet interface further comprises a receiving end for receiving the gas stream, the receiving end being orthogonal to the wellhead.

In some embodiments, the top inclination angle is variable for varying fluid stream conditions. In some other embodiments, the bottom inclination angle is variable for particulate stream conditions.

According to another broad aspect of this disclosure, there is provided a method for desanding a fluid stream emanating from a wellhead, the fluid stream containing gas, entrained liquid and particulates, the method comprising: providing an elongated vessel extending from a proximal end downwardly towards a distal end and having a diverging bounding wall to define a top inclination angle and a bottom inclination angle larger than the top inclination angle; injecting, at a first fluid velocity, the fluid stream into the vessel from the proximal end at about the first inclination angle; directing, at a second fluid velocity slower than said first fluid velocity, said fluid stream along an elongated flow path in the vessel from the proximal end towards the distal end to allow an effective amount of the entrained liquid and particulates fall out of the fluid stream and move into a belly portion; collecting desanded gas in a freeboard portion, said freeboard portion being above the belly portion and being separated therefrom by a gas/liquid interface; and discharging the desanded gas from the freeboard portion at the distal end; wherein said desanded gas is free of a substantial portion of the particulates.

In some embodiments, the method further comprises collecting desanded liquid from the belly portion and discharging, from the belly portion, the desanded liquid with the discharged gas at the distal end.

DETAILED DESCRIPTION

A desander is typically inserted between or as a replacement for existing piping such as connecting piping between a wellhead and downstream equipment such as multiphase separators.

Figure 1:
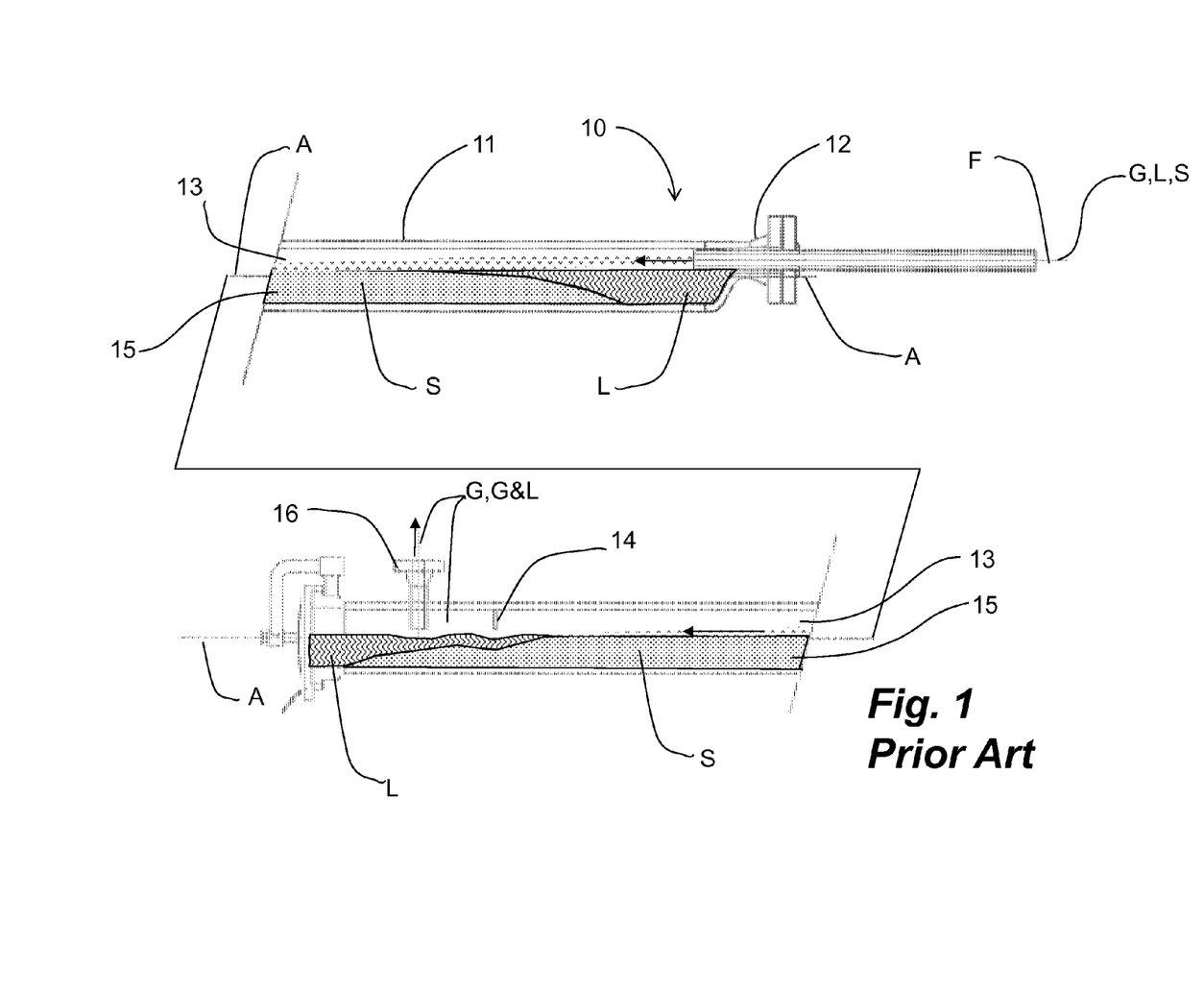
FIG. 1 is a cross-sectional side view of Applicant's prior art elongated horizontal desander illustrating downcomer flow barrier, fluid streams, falling trajectory of particulates, and accumulations of separated liquid, particulates and particulate-free fluid discharge.

As shown in FIG. 1, a prior art horizontal desander comprises a cylindrical pressure vessel 11 having a substantially horizontal axis A, a first fluid inlet end 12 adapted for connection to the fluid stream F. The fluid stream F typically comprises a variety of phases including gas G, some liquid L and entrained particulates such as sand S. The fluid stream F containing sand S enters through the inlet end 12 and is received by a freeboard portion 13. In the illustrated prior art vessel, the freeboard area is set by a downcomer flow barrier 14. Accordingly, the velocity of the fluid stream F slows to a point below the entrainment or elutriation velocity of at least a portion of the particulates S in the fluid stream. Given sufficient horizontal distance without interference, the particulates S eventually fall from the freeboard portion 13. Particulates S and liquids L accumulate over time in the belly portion 15 and are periodically cleaned out at sufficient intervals to ensure that the maximum accumulated depth does not encroach on the freeboard portion 13. The desanded fluid stream, typically liquid L and gas G, emanates from fluid outlet 16.

As shown in FIGS. 2 through 7, embodiments of an inclined desander 20 are free of the prior art flow barrier and, through tilting or inclination of the vessel, maximize freeboard upon entry of the flow stream, and reduce liquid flow rates for maximizing settling conditions therein and retention of captured particulates S. Variability of the inclination angle α enables a measure of variability between the respective freeboard and liquid-storing belly portion for adjusting performance.

Figure 2:
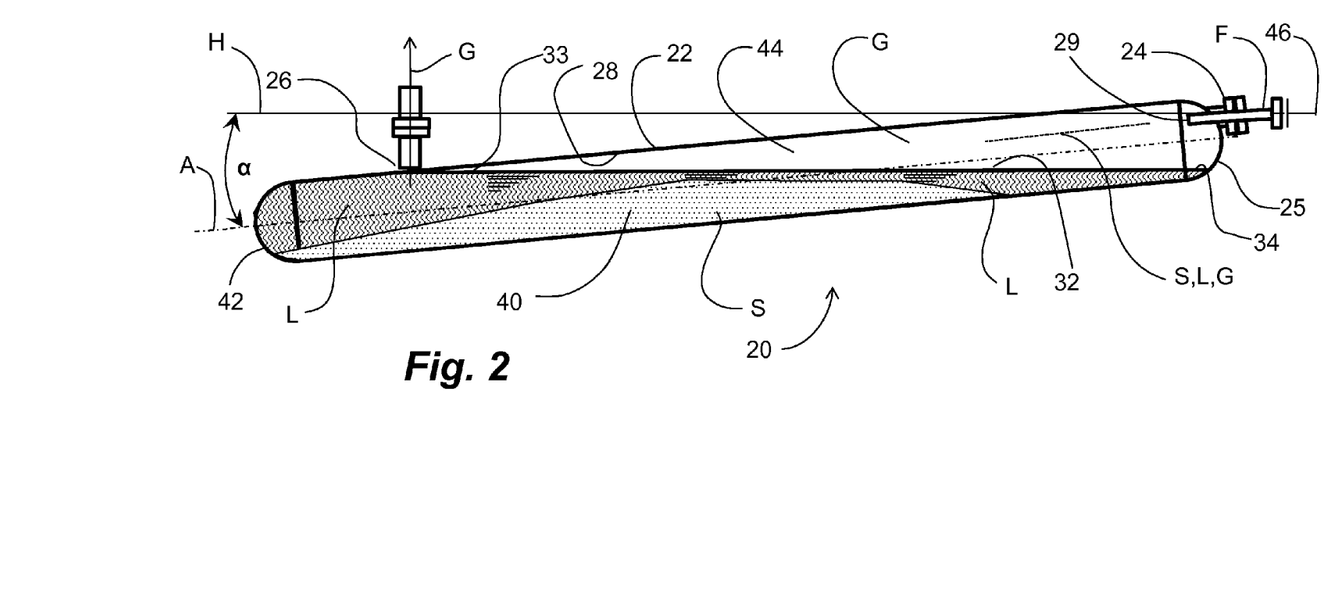
FIG. 2 is a cross-sectional view of an embodiment of a tilted or inclined desander.

As shown in FIG. 2, the desander 20 comprises a vessel 22 having an axis A oriented at an acute angle α to the horizontal H. The desander 20 has a fluid inlet 24 at an upper end 25 for receiving a fluid stream F typically comprising a variety of phases including gas G, some liquid L and entrained particulates such as sand S. In this embodiment, the fluid inlet 24 is oriented parallel to a longitudinal axis A of the vessel 22. A fluid outlet 26 is located along a top 28 of the vessel 22, and spaced from the fluid inlet 24. In an operating state, a gas/liquid interface 32 forms extending horizontally from about the fluid outlet 26. A belly portion 40 is formed below the interface 32 for containing liquid L and particulates S. A freeboard portion 44 is formed above the interface 32. The fluid inlet 24 discharges into the freeboard 44. Particulate trajectory can be manipulated by positioning and orienting a discharge end 29 of the fluid inlet 24. In one embodiment, the discharge 29 of the inlet 24 can be aligned parallel to the vessel axis A. The inlet 24 or discharge 29 can be oriented in other orientations including above the inclined axis A, or below the axis A.

The interface 32 is a generally obround, gas/liquid interface between the belly and freeboard portions 40, 44. The obround interface 32 has a distal end 33 adjacent the fluid outlet 26 and a proximal end 34, the location of which is intermediate the fluid outlet 26 and fluid inlet 24 and varies with liquid level and inclination angle α. As a result of the desander 20 inclination, the trajectory of the fluid stream F, from inlet 24, converges with the interface 32. The trajectory for dropping sand S and liquid L into the belly portion 40 is foreshortened, reducing drop out time. The vessel 22 is long enough to space the fluid inlet 24 sufficiently from the interface 32 to minimize turbulence of the liquid L in the belly portion 40, that spacing being dependent upon various design factors including vessel inclination angle α, inlet fluid stream velocity and characteristics.

At a steady state, the maximum level of the interface 32, is controlled at the distal end 33, set by eventual liquid entrainment and discharge at the fluid outlet 26. Gas G discharges at the fluid outlet 26. At steady state, when the liquid level reaches the fluid outlet 26, any oil and other liquids are re-entrained with the gas G exiting at fluid outlet 26. Particulates S continue to be captured in the belly portion 40 until its volumetric capacity is reached.

Connective piping 46, between conventional wellhead and downstream equipment, is typically in rectilinear or orthogonal arrangements. Thus, the angle α of the desander 20 introduces coupling or connection challenges. The connective piping 46 is generally horizontal or vertical and incorporation of the inclined desander 20 requires an adjustment made at the fluid inlet 24 and fluid outlet 26. In many scenarios, with a small inclination angle α, the fluid outlet 26 can be fit to the top 28 of the vessel 22 at angle α, orienting the outlet 26 vertically and thereby obviating the need for an angular transition.

Figures 3A, 3B:
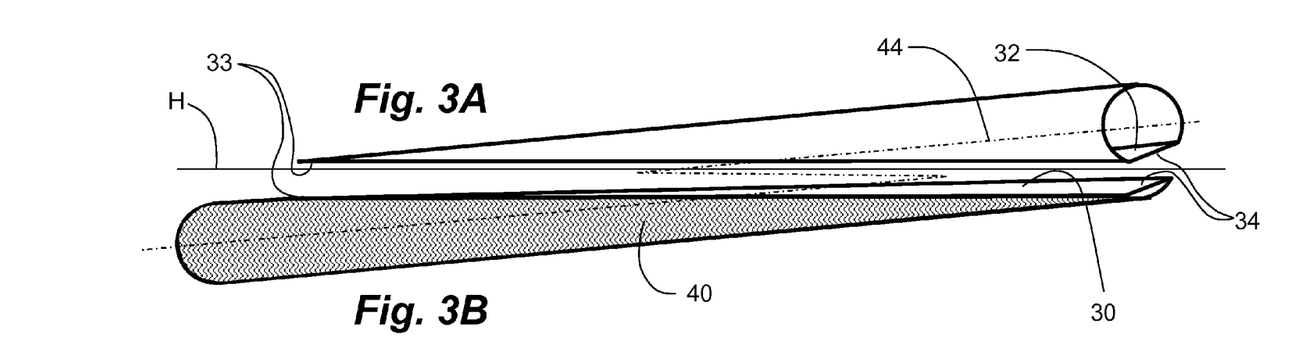
FIGS. 3A and 3B are perspective representations of the volumes of the belly portion and freeboard portions of the inclined desander of FIG. 2.
Figure 4:
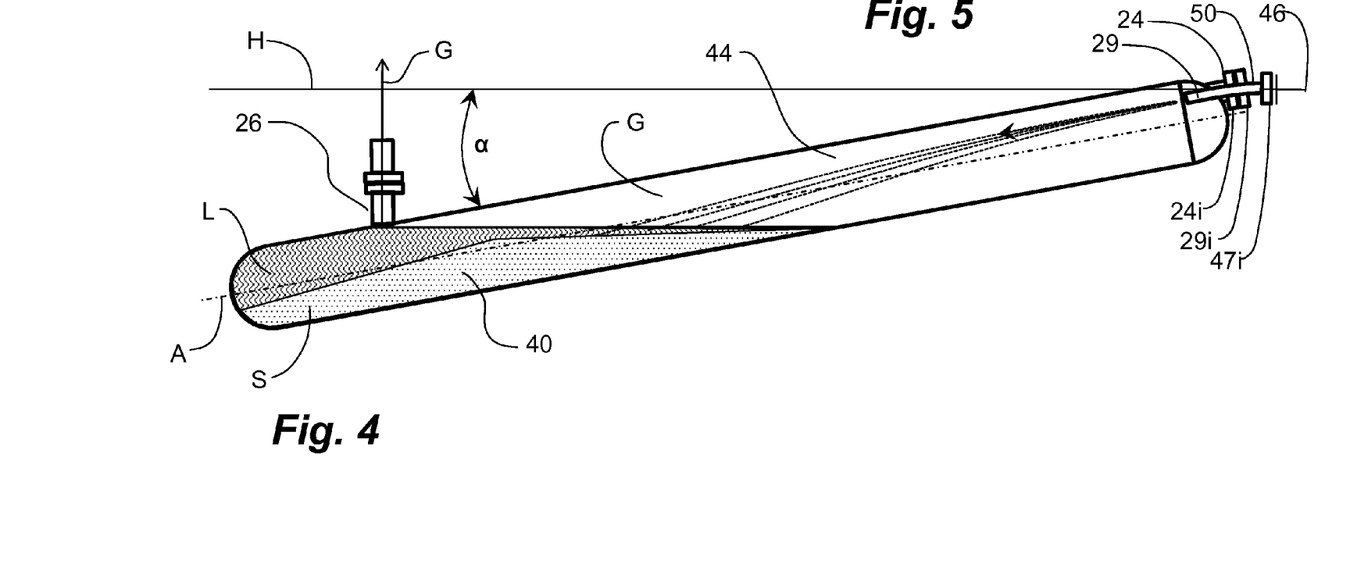
FIG. 4 is a cross-sectional view of another embodiment of an inclined desander having a greater inclination angle than that of FIG. 2.

Turning to FIGS. 3A and 3B, the desander 20 is shown diagrammatically split at the interface 32 for illustrating the incrementally increasing volume of the belly portion 40 below and the incrementally decreasing volume of freeboard portion 44, increasing and decreasing as referenced to the feed stream F. The freeboard portion 44 demonstrates a cross-sectional area which diminishes from the fluid inlet 24 to the fluid outlet 26. As shown in FIGS. 2 and 4, a freeboard velocity at the fluid inlet 24 is such that the entrained liquids L and particulates S fall out of the fluid stream F and collect in the storage belly portion 40. The cross-sectional area of the freeboard portion 44, adjacent the fluid inlet 24, is at its greatest for achieving the lowest average inlet velocity for maximum drop out efficiency for particulates S and liquids L. As the freeboard cross-sectional area adjacent the fluid inlet 24 is large and relatively unimpeded by the belly portion 40, the velocity reduction upon discharge is significantly greater than that of Applicant's prior art horizontal desander. Particulate removal is accomplished while minimizing the portion of the vessel allocated to the freeboard portion 44, maximizing the efficiency of that freeboard portion for particulate drop out, and resulting in a greater allocation of the overall portion of the vessel to the belly portion 40 for storage.

Velocity in the freeboard portion 44 increases after a substantial portion of the particulates S have already deposited in the belly portion 40. The cross-sectional area of the belly portion 40 increases towards the fluid outlet 26 and the velocity of liquids accumulating therein diminishes.

With reference again to FIG. 2 and to FIG. 4, in the belly portion, particulates accumulate and flow downvessel at an angle of repose. The accumulation of liquid L and particulates S establishes a downward flow in the belly portion, and as the particulates accumulate and limit the free flow of the liquid L in the belly portion 40, the liquid velocity begins to increase, drawing more particulates S downvessel.

With reference to FIG. 4, the inclination angle α can be adjusted, shown here as an increased angle over that of FIG. 2. At increasing angles α the trajectory of the feed stream impinges the interface 32 at less acute angle, impinges the interface 32 sooner and enables selection of shorter vessels 22 and greater particulate removal efficiency.

Inclination angles α can be adjusted, for a given length of vessel 22, between fluid inlet 24 and fluid outlet 26, to accommodate gas G and liquid L content in the feed fluid stream F. Inclination angles α would generally be in the range of about 2 degrees to about 20 degrees. The shallowest operating angle α is limited by the minimum requirement for a minimum freeboard 44 cross-sectional area adjacent the inlet 24 once the interface 32 builds to about the fluid outlet 26. The steepest operating angle α is limited by the requirement for a minimum storage capacity in the belly portion 40. The minimum inclination angle would be the condition where the inlet 24 is entirely in the gas phase of the freeboard portion 44 and the gas phase at the discharge is of zero height. The maximum inclination angle would be the condition where the inlet 24 is well above the gas/liquid interface allowing substantial freeboard to handle slug flow. Angles above 45 degrees limit the performance of desander considerably since the residence time of the liquid phase in the belly portion 40 is reduced.

Figure 5:
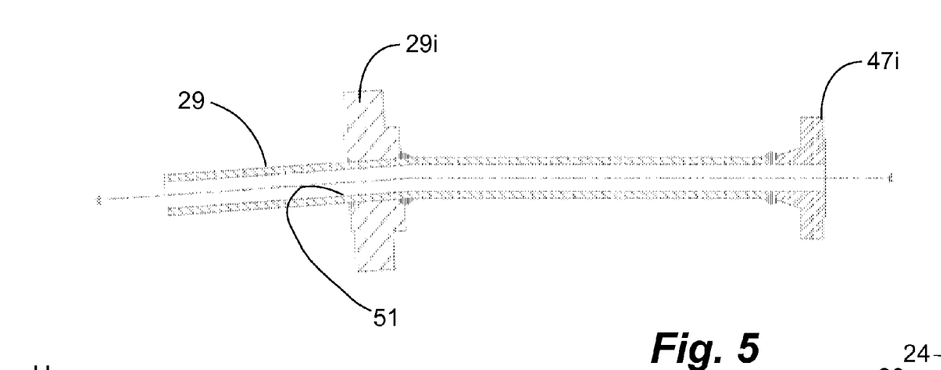
FIG. 5 is a cross sectional view of a curved fluid inlet, square to the desander, and having a long radius angular transition elbow between orthogonal piping and the inclined desander.

With reference to FIGS. 4 and 5, the fluid inlet 24, exposed to entrained particulates S in the fluid stream, is subject to greatest risk of erosion. While the inlet 24 can be integrated with the vessel 22, one can also provide an inlet 24 or discharge 29 that is replaceable for ease of maintenance. Options include accepting eventual wear and shutdown of the desander 20 for replacement of an integrated inlet 24; modifying the material or configuration of the inlet 24 to prolong service life, or using replaceable discharge of nozzle for minimizing turnaround time. As stated, one approach is to make the discharge 29 replaceable including incorporating features of a replaceable nozzle as set forth in Applicant's Patent CA 2,535,215 issued May 8, 2008. A replaceable nozzle 50 can be fit to a compatible coupling at the upper end 25 of the vessel 22. One form of replaceable nozzle 50 comprises the discharge 29, and a threaded connection or nozzle flange 29i, for connection to a compatible threaded connection or flange 24i at the inlet 24 of the vessel 22. The orientation of the discharge is dependent on the coupling 24i, 29i and arrangement of the discharge relative thereto. The replaceable nozzle 50 includes a connecting piping coupling, such as a connective flange 47i for connecting to the piping 47.

To maximize service life, the nozzle 50 can incorporate a curved portion 51, such as a long radius elbow, transition between the orthogonal world of the connecting piping and the inclined axis A of the vessel 22. That curved portion 51 can be integrated with the inlet 24, nozzle 50 or located in advance thereof, such as in a transition pup joint.

In operation, various sizes are desanders are employed in the prior art for differing operational conditions. Prior art desanders 10, such as that described in U.S. Pat. No. 6,983,852 to Applicant, for different feed fluid streams F, might include one typical standard vessel 11 having a nominal 0.3 m (12 inch) diameter by 3.048 m (10 feet) long and another vessel 11 having 0.3 m (12 inch) diameter by 6.096 m (20 feet) long, both of which are fitted with a downcomer weir to set the freeboard portion.

Herein, in the inclined desander 20, the prior art downcomer flow barrier, such as a weir, can be eliminated by providing similar 0.3 m (12 inch) diameter vessels 22 and tilting the upper end 30 of the new desander 20 at about twice the prior art weir height so as to form the interface 32 at the fluid outlet 26. To mimic the minimum operating performance of the 3.048 m (10 feet) and 6.096 m (20 feet) prior art desanders, a 20 foot long inclined vessel 22 would only need to be inclined about ½ the angle α of the 10 foot long inclined vessel 22. Performance can be adjusted by varying the angle.

An example of an inclined desander 20 includes that sized to receive a fluid stream F of 50 $m^3/d$, bearing particulates S having an average size of 150 um. The fluid stream typically includes sufficient liquid to accumulate in the belly portion. The fluid stream F is discharged to vessel 22, having a 0.3 m (1 foot) diameter and 3.048 m (10 feet) long. A typical pressure of the fluid stream F is about 7000 kPa (1015 psia). At an inclination angle α of 4.9 degrees, the freeboard volume is 0.10 $m^3$ and the belly portion is 0.486 $m^3$. The resulting belly portion capacity is about 502 kg of liquid and sand particulates.

Figure 6:
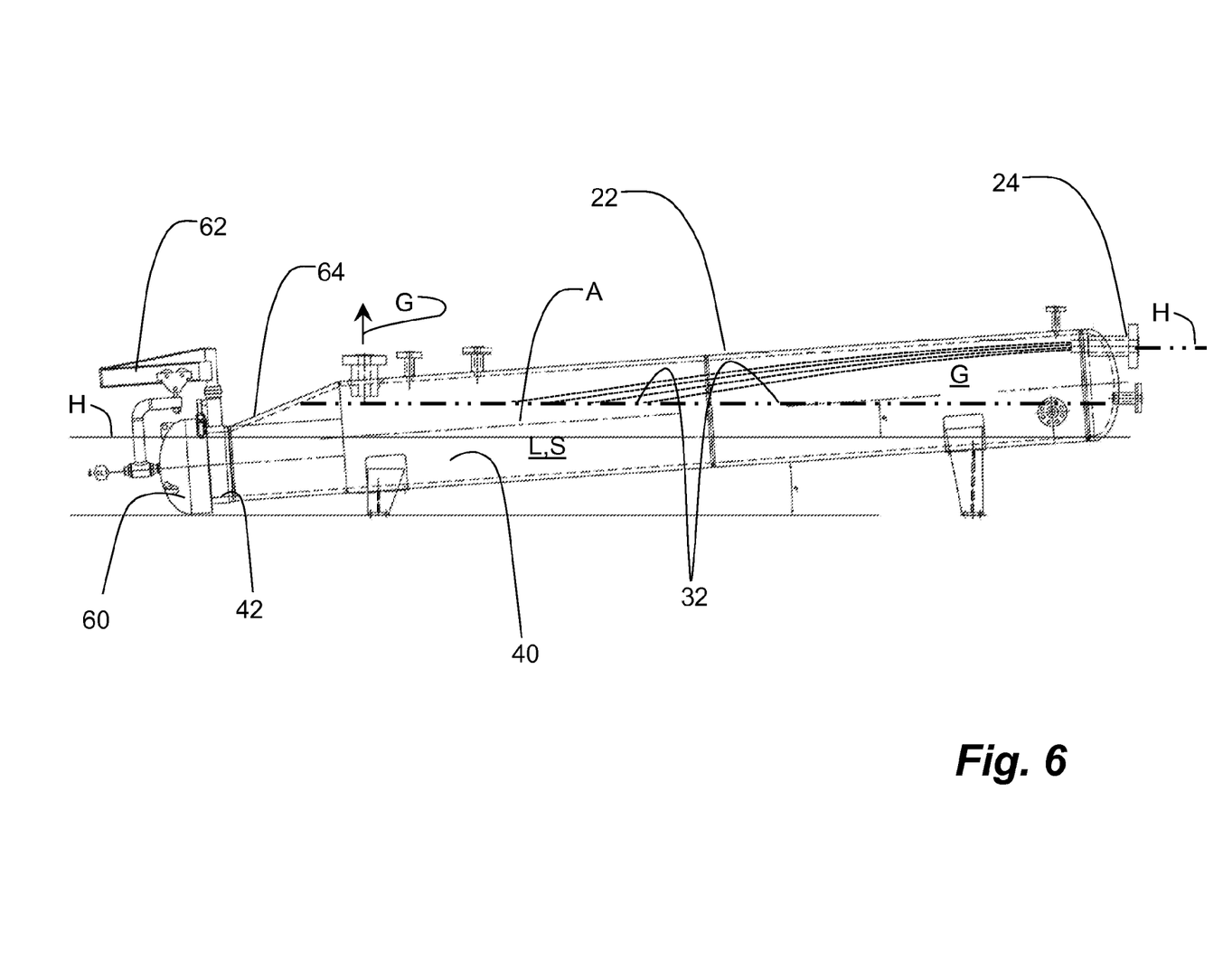
FIG. 6 is a representation of an inclined desander illustrating parameters for an example 36 inch diameter desander having a horizontal fluid inlet.

As shown in FIG. 6, another embodiment of an inclined desander 20 illustrates some additional optional characteristics including a fluid inlet 24 oriented horizontally, the inlet being directly connectable to orthogonal connection piping. The discharge 29 is oriented at an angle to the longitudinal axis A, in this case in a generally horizontal plane, which is angled upwardly from axis A. The initially horizontal trajectory of a substantial portion of the feed stream falls off before engaging the vessel 22. In part, the inlet 24 can be square to the connective pipe as, in this embodiment, the vessel 22 is of sufficient diameter, such as 36 inches, to permit inlet placement in the freeboard 44 while the trajectory is such that it minimizes or avoids vessel wall involvement. As shown, a horizontal spacing between the inlet 24 and inside wall of the vessel 22 is about 1.5 feet.

Removal of accumulated particulates is conducted periodically with the vessel 22 shut in, adjacent the inlet 24 and outlet 26, and depressurized. Conveniently, access can be through a pressure-rated access closure and port at the lower end 42, as the angle of repose and flow in the belly portion carries particulates thereto. A suitable closure is shown in FIG. 1 of the prior art and in FIG. 6 as adapted to the inclined desander 20. The vessel 22 is supported sufficiently high of the ground or otherwise positioned for angular access thereto, such as with scrapers and the like. A pressure vessel, hemispherical head-form of closure 60 can be pivoted from the vessel 22 and counterweighted to close flush to the inclined cylindrical end of the vessel 22. A gantry 62 assists in manipulation of the head for access to the belly portion 40.

Further, the illustrated vessel 22 includes an eccentric end 64 at the lower end 42, to reduce the diameter of the vessel 22 downstream of the fluid outlet 26. Advantages of reducing the vessel diameter at the lower end 42 include adapting to a smaller, more easily manageable or standard form of clean out. As shown the cleanout is a pressure-rated closure 60 supported upon gantry 62. In this embodiment, a 36 inch vessel, having 33 inch internal diameter, is inclined at 4 degrees. The cylindrical portion of the vessel is about 20 feet long with a 3 foot long eccentric portion, reducing the diameter from 3 to about 18 inches for fitting an 18 inch clean out.

Conventional pressure safety valves and other gas phase related devices and instrumentation, not shown, are reliably located in the freeboard portion 44 between the fluid outlet 26 and the upper end 25.

Figure 7:
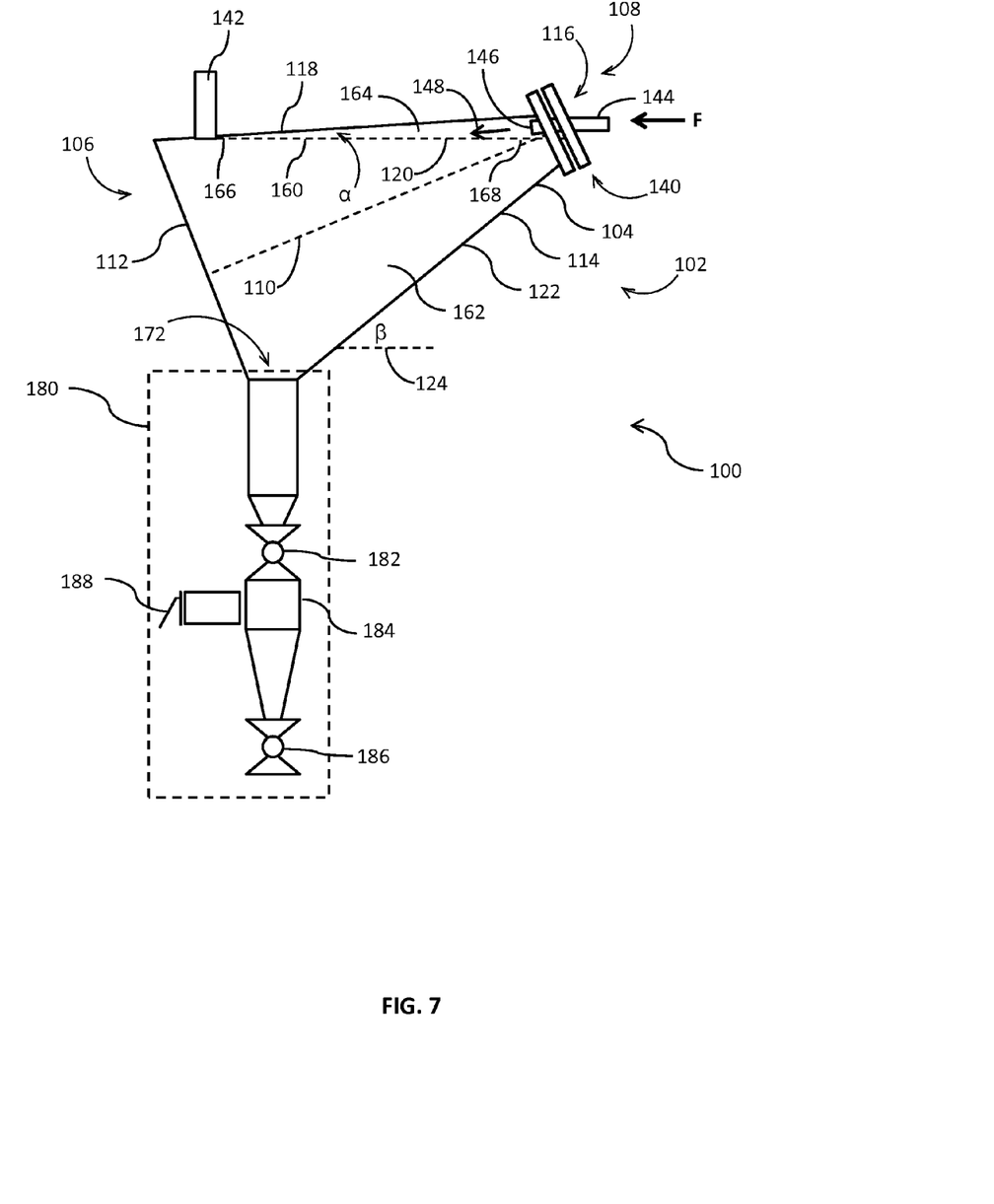
FIG. 7 is a cross-sectional view of a desander having a tilted conical vessel, according to another embodiment.

FIG. 7 shows a cross-sectional view of a desander 100, according to an alternative embodiment. The desander 100 comprises a tilted vessel 102 coupled to a particulate collection structure 180. The desander 100 does not require a flow barrier. The vessel defines an elongate, enclosing volume having a surface or diverging bounding wall terminated at opposing ends; a proximal end accommodating a flow inlet, and a distal end. A portion of the bounding wall is oriented as a top wall and a portion of which is oriented as a bottom wall. The top wall is tilted downwardly in the direction of flow at a first angle of inclination. The bottom wall is also tiled downwardly in the direction of flow. The slope of the bottom wall is divergent from the top wall so as to have a second angle of inclination that is greater than that of the top wall.

Such volumes are accomplished by vessel geometries including a conical shape. Generally a conical vessel can be a circular cone having an axis extending from the apex to the base and a surface thereabout, the axis of which is angled so that the top wall has the downward and first angle of inclination. A right conical vessel has a circular cross-section; however, non-circular cross-sections are contemplated including elliptical, obround and polygonal. One skilled in the art would have to account for the use of non-conventional shapes when considering pressure boundaries or use a conventional pressure boundary with non-pressure bearing internals of the proposed shapes.

By exploiting a tilted or inclined vessel 102 with divergent top and bottom walls, the desander 100 maximizes the effectiveness of the freeboard portion, and reduces liquid flow rates to optimize settling conditions therein and improve retention of captured particulates S. Herein, components described as proximal and distal as related to their proximity to the inlet.

In the context of a right conical shape vessel 102, a conical body 104 extending from a lower, distal end 106 tapering to an upper, proximal end 108 with a central axis 110 upwardly slanting from a horizontal line (not shown). In this embodiment, the vessel is a right circular conical frustum having a circular distal base 112 at the lower, distal end 106 perpendicular to the central axis 110, a geometric surface comprising a conical wall 114 shown axially symmetrical to the central axis 110, and an apex 116 at the upper, proximal end 108. For accommodation of a flow inlet, apex 116 is truncated for installation of connecting hardware such as flanges.

The vessel 102 is characterized by a first, acute top inclination angle α defined by a top wall 118 of the body 104 and a horizontal line 120, and a second, bottom inclination angle β defined by the bottom wall 122 of the body 104 and a horizontal line 124. The top inclination angle α is selected for forming the freeboard portion of the vessel, and the bottom inclination angle β is selected for forming a belly portion that minimizes sand deposition and instead encourages a mobile sand dune for migration of settled particulates to a sump at the bottom of the vessel and subsequent transferring to a sand accumulator.

The relationship between the top and bottom inclination angles α and β, the diameter of the circular distal base 112, the diameter of the circular truncated apex 116 and the length (i.e., the distance between the distal base 112 and the truncated apex 116) of the vessel 102 is:

$$\beta = \text{Arctan}((D\_distal - D\_proximal)/2/L)) \times 2 + \alpha,$$

where Arctan( ) represents the arctangent function, D_distal represents the diameter of the circular distal base 112, D_proximal represents the diameter of the circular truncated apex 116, and L represents the length of the vessel 102 measured along the central axis 110. Therefore, the vessel 102 may be customized in design by selecting a proper vessel length, diameter of the circular distal base 112, ratio of the diameter of the circular distal base 112 to that of the circular truncated apex 116, and top inclination angle α to meet a process performance requirement.

The vessel 102 comprises a fluid inlet interface 140 at the upper proximal end 108 and a fluid outlet 142 located on the top side of the vessel in proximity with the distal end 106 and spaced from the fluid inlet interface 140. The fluid inlet interface 140 comprises a receiving end 144 outside the vessel 102 for receiving a fluid stream F typically comprising a variety of phases including gas G, some liquid L and entrained particulates such as sand S, and a discharge end 146 inside the vessel 102 for discharging the received multiphase fluid stream F into the vessel at an inlet velocity. The position and orientation of the discharge end 146 determine the particulate trajectory. In this embodiment, the discharge end 146 is oriented such that the received fluid F is injected into the vessel along a direction 148 parallel to the top wall 118. However, in some other embodiments, the discharge end 146 may alternatively be oriented in other orientations, e.g., an angle smaller or larger than that of the top wall 118, depending on the design.

In an operating state, a gas/liquid interface 160 forms extending horizontally in the vessel 102 from about the fluid outlet 142. The gas/liquid interface 160 is a generally elliptic, gas and liquid interface having a distal end 166 adjacent the fluid outlet 142 and a proximal end 168, the location of which is determined by the lower end of the fluid outlet 142 and the top inclination angle α. A freeboard portion 164 is formed above the gas/liquid interface 160. A belly portion 162 is formed below the gas/liquid interface 160 for containing liquid L and particulates S. The belly portion 162 has a large volume as the diameter of the vessel 102 increases towards the distal end 106.

A fluid stream discharged from the fluid inlet interface 140 travels along an elongated flow path from the fluid inlet interface 140 to the fluid outlet 142. As the freeboard portion 164 has a cross-sectional area greater than that of the fluid inlet interface 140, the fluid velocity in the freeboard portion adjacent the fluid inlet interface 140, is less than that in the inlet, and particulates cannot be maintained in suspension.

By properly selecting length of the vessel to be sufficiently long and the freeboard velocity to be sufficiently low, when a fluid stream is discharged from the fluid inlet interface 140 and travels along the flow path, an effective amount of the entrained liquid L and particulates S fall out of the fluid stream and collect in a belly portion 162 (described later). A desanded fluid stream is discharged from the vessel via the fluid outlet 142.

The trajectory of the fluid stream F, from inlet 140, converges with the gas/liquid interface 160. The trajectory for dropping sand S and liquid L into the belly portion 162 is foreshortened, reducing drop out time. The vessel 102 is of sufficient length to space the fluid inlet 140 sufficiently from the gas/liquid interface 160 to minimize turbulence of the liquid L in the belly portion 162, that spacing being dependent upon various design factors including vessel top inclination angle α, bottom inclination angle β, inlet fluid stream velocity and characteristics.

At a steady state, the level of the gas/liquid interface 160 is controlled by the fluid outlet 142 in proximity with the distal end 106, set by eventual liquid entrainment and discharge at the fluid outlet 142. At steady state, when the liquid level reaches the fluid outlet 142, any oil and other liquid is re-entrained with the gas G exiting at fluid outlet 142. In this state, the fluid stream discharged from the fluid outlet 142 has about the same gas/liquid ratio as the stream received at the inlet 140. In other words a mass balance is established in that discharged liquid matches incoming liquid.

Particulates S continue to be captured in the belly portion 162, creating an unstable sand bank. In a steady state liquid filled environment, the particulates form a sand bank on the lower portion of the vessel 102. The bottom inclination angle β of the vessel 102 is selected to be steep enough, e.g., to be about or larger than the angle of repose of a bank of wet particulates. Thus, the sand and liquid migrate towards the bottom of the vessel 102 via a lower discharge 172 into the particulate collection structure 180, and fall through the open valves 182 into the sand accumulation chamber 184. In the embodiments in which particulates are periodically or continuously removed from the lower discharge 172, the liquid discharged from the fluid outlet 142 will, on occasion, be less than that in the incoming liquid by the amount removed with the particulates.

Having a lower discharge 172, at least particulates are collected and discharged from the belly portion. Typically particulates and liquid are collected in the belly portion and are periodically or continuously discharged therefrom. With a gas/liquid interface formed, liquid is discharged with desanded gas from the freeboard portion at the distal end at the fluid outlet 142.

When in use, the fluid inlet 140 and the fluid outlet 142 are connected to the connective pipes of a conventional wellhead and downstream equipment (not shown), respectively. The receiving end 144 of the fluid inlet interface is typically orthogonal to the wellhead. As the connecting pipes are typically in rectilinear or orthogonal arrangements, the fluid outlet 142 is configured in a vertical orientation and thereby obviates the need for an angular transition.

As described above, the fluid inlet 140, being exposed to entrained particulates S in the fluid stream F, is subject to significant risk of erosion, and has to be properly designed to ensure the regular use of the desander 100. Methods described above, e.g., using appropriate material or configuration to prolong its service life, regularly replacing the worn-out fluid inlet, and/or using a replaceable discharge of nozzle, may be used in various embodiments. In this embodiment, a replaceable nozzle as shown in FIG. 5 that has a discharge end with an inclination angle α and a horizontal receiving end is used for coupling to the horizontal connective pipe (not shown).

Velocity in the freeboard portion 164 increases after a substantial portion of the particulates S have already deposited in the belly portion 162. The cross-sectional area of the belly portion 162 increases towards the fluid outlet 142, and the velocity of liquids accumulating therein diminishes.

In the belly portion 162, particulates accumulate and flow down the vessel 102 at an angle of repose. The accumulation of liquid L and particulates S establishes a downward flow in the belly portion 162, and as the particulates accumulate and limit the free flow of the liquid L in the belly portion 162, the liquid velocity begins to increase, drawing more particulates S down vessel. As the bottom inclination angle β is greater than the angle of repose of a bank of wet particulates, the sand will migrate towards the particulate collection structure 180.

For a given length of vessel 102, or a given distance between the fluid inlet 140 and the fluid outlet 142, the top inclination angle α may be selected to meet the requirement of accommodating gas G and liquid L content in the feed fluid stream F. The smallest top inclination angle α is limited by the minimum requirement for a minimum freeboard 164 cross-sectional area adjacent the inlet 140 once the gas/liquid interface 160 builds to about the fluid outlet 142. The largest top inclination angle α is limited by the requirement for a minimum freeboard gas capacity to accommodate particulate removal of any sand S in the gaseous phase G of the incoming fluid stream F. In particular, the minimum top inclination angle α is the minimum inclination angle of the top wall 118 that ensures the inlet 24 be entirely in the freeboard 164 when the gas/liquid interface 160 reaches the bottom of the fluid outlet 142. The maximum top inclination angle α is the inclination angle of the top wall 118 at which the inlet 140 is well above the gas/liquid interface 160 allowing substantial freeboard to handle slug flow. Moreover, if a greater top inclination angle α is used, the trajectory of the injected fluid stream F impinges the gas/liquid interface 160 at less acute angle, impinges the gas/liquid interface 160 sooner and allows the use of shorter vessels 102 and greater particulate removal efficiency. As increasing the top inclination angle α also increases the bottom inclination angle β, a larger top inclination angle α thus reduces the need for a steeply tapered cone shape of the vessel 102.

In this embodiment, the top inclination angle α is preferably selected from the range of about 2 degrees to about 20 degrees.

For a given length of vessel 102, the bottom inclination angle β may be selected to be great than or equal to the estimated angle of repose of a wet sand bank to facilitate smooth particulates drop-off. Generally, the bottom inclination angle β is larger than the top inclination angle α. The conical shape vessel 102 is determined after the length of the vessel 102, the top and bottom inclination angles α and β are selected.

In one example, a desander 100 comprises a conical shape vessel 102 having a circular distal base of diameter 0.91 meter (36 inches), a circular truncated apex of diameter 0.154 meter (i.e., 6 inches) and a length of 3.05 meters (i.e., 10 feet). The vessel is tilted such that the bottom inclination angle β is 35 degree.

Referring again to FIG. 7, the vessel 102 comprises a lower discharge 172 coupled to the particulate collection structure 180 to allow particulates and liquid to migrate thereto. The particulate collection structure 180 comprises a sand accumulation chamber 184 sandwiched between an inlet valve 182 and a discharge valve 186. The inlet valve 182 is connected to the vessel 102 on top thereof and to the sand accumulation chamber 184 therebelow, and the sand accumulation chamber 184 is in turn connected to the discharge valve 186 therebelow. The particulate collection structure 180 also comprises a particulate detector 188, e.g., an ultrasonic sand detector, to detect particulate accumulation in the sand accumulation chamber 184.

The inlet valve 182 may be set to the open position and the discharge valve 186 set to the closed position in normal operation to allow the sand accumulation chamber 184 to collect particulates and liquid from the vessel 102.

Unlike the prior art desanders that require shutting down the operation to depressurize the vessel 102 for removing accumulated particulates, the removal of accumulated particulates can be conducted periodically with the vessel 102 being pressurized and in operation. For this purpose, the valves 182 and 186 are controlled automatically by the particulate detector 188 to periodically open and close. Typically, an interlock is used to prevent the inlet and discharge valves from being open at the same time. In particular, the valve 182, between the vessel 102 and the sand accumulation chamber 184 is normally open except at the time of particulate removal, allowing particulates to fall into the accumulator. The discharge valve 186 is normally closed except at the time of particulate removal.

To remove particulates while maintaining the desander 100 in operation, the valve 182 is first closed. Valve 186 is then opened allowing the particulates contained in the sand accumulation chamber 184 to exit. Usually, valve 186 is opened only for a short period of time sufficient to allow the volume of the sand accumulation chamber 184 to be evacuated. After removing particulates from the sand accumulation chamber 184, valve 186 is closed and valve 182 is then reopened to allow particulates in the particulate drop out the vessel 102 to migrate into the sand accumulation chamber 184. The belly portion 162 of the vessel has sufficient space to store particulates inside the vessel 102 during the particulates-removing process, and the volume of the sand accumulation chamber 184 is sufficiently large to discharge enough particulates within a cleaning cycle so as not to cause a backup of particulates into valve 182 thereby preventing the valve to close. Both valves 182 and 186 are required to have service rated for abrasive slurries.

As an alternate, if line washing is desired and the downstream piping is able to support the pressure, valve 182 can be left open. Valve 186 is opened only for a short period of time, sufficient to allow the volume of the sand accumulation chamber 184 to be evacuated.

Conventional pressure safety valves and other gas phase related devices and instrumentation, not shown, are reliably located in the freeboard portion 164.

Although not shown in the figures, the vessel 102 is supported by supporting structure to maintain the vessel 102 in its vertical orientation.

In an alternative embodiment, the top inclination angle of the vessel 102 is adjustable at the time of installation. The fluid inlet 140 and outlet 142 are rendered orthogonal. After installation, the orientation of the vessel 102, the receiving end 144 of the inlet 140, the fluid outlet 142 and the particulate collection structure 180 is then fixed for operation.

In another embodiment, the support structure comprises an inclination adjustment structure for adjusting the inclination angle of the vessel 102 to adapt to fluid stream conditions and or particulate stream conditions. For example, the support structure may comprise a first support anchor pivotably coupled to the vessel 102 at a position near the distal end thereof, and a second support anchor pivotably coupled to the vessel 102 at a position near the truncated apex thereof. The height of the first and/or second support anchors is adjustable such that the inclination angle of the vessel may be adjusted by adjusting the height of the first and/or second support anchors.

The fluid outlet 142 and the particulate collection structure 180, each facilitated by a correcting insert or spool attached thereon, may be pivotable within a predefined range of angle to allow a generally orthogonal orientation under any suitable inclination angle of the vessel 102. The inlet 140 may also be pivotable within a predefined range of angle such that the orientation of the receiving end 144 thereof may be adjusted to adapt to the orientation of the vessel. In yet another embodiment, a set of inlets 140 are provided to allow users to choose an inlet 140 suitable for an orientation-adjusted vessel 102 and install it thereon.

Persons skilled in the art appreciate that various alternative embodiments are readily available. For example, although in above embodiment, a particulate detector 188 is used for detecting particulate accumulation in the sand accumulation chamber 184, in an alternative embodiment, a timer may alternatively be used to periodically control valves 182 and 186 to remove particulates from the sand accumulation chamber 184. In another embodiment, no particulate detector or timer is used, and the valves 182 and 186 are manually controlled to remove particulates from the sand accumulation chamber 184.

Although in above embodiments, the vessel 102 is a tilted, right circular conical frustum, in some other embodiments, the vessel 102 may be an oblique circular frustum such that the circular distal base located at the lower, distal end of the vessel is not perpendicular to the central axis.

Although in above embodiments, the vessel 102 tapers from the distal end to a smaller, truncated apex at the proximal end, in some alternative embodiments, the vessel 102 has a constant diameter from the distal end to the proximal end.

Those skilled in the art appreciate that the particulate collection structure 180 may alternatively comprise different components. For example, in some alternative embodiments, the particulate collection structure 180 may be a simple sand sump having no valve.

As appreciated by persons skilled in the art, the desanding devices in the embodiments described above are made of suitable material for the environment, fluid and pressures, such as steel or the like, with specifications satisfying relevant safety code requirements.

The embodiments of the invention for which an exclusive property or privilege is claimed are defined as follows:

1. A vessel for removing particulates from a multiple-phase fluid stream containing gas, entrained liquid and particulates, the vessel comprising:
    a volume having a diverging bounding wall, a distal base, and an apex; the diverging bounding wall having a top wall at a first inclination angle and a bottom wall at a second inclination angle; the second inclination angle at a greater angle than the first inclination angle;
    a fluid inlet interface at the apex for receiving said fluid stream into the containing volume of the vessel;
    a fluid outlet on the top wall of the vessel, spaced from the fluid inlet interface;
    a horizontally extending freeboard interface separating a freeboard portion formed adjacent an upper portion of the vessel above the interface and a belly portion therebelow, the belly portion being bounded at its bottom by the bottom wall, the freeboard portion forming a freeboard cross-sectional area for a freeboard velocity of the fluid stream less than a fluid stream velocity at the fluid inlet interface; and
    an elongated flow path for receiving the fluid stream from the fluid inlet interface and directing the fluid stream to the fluid outlet; wherein
    said length of the elongated flow path and the freeboard velocity being such that an effective amount of the entrained liquid and particulates fall out of the fluid stream, the particulates settle towards the bottom wall of the belly portion, and desanded gas is collected in the freeboard portion; and wherein the desanded gas flows out of the freeboard portion through the fluid outlet and is free of a substantial portion of the particulates.

2. The vessel of claim 1 wherein the second inclination angle is greater than the angle of repose of settled particulates.

3. The vessel of claim 1 wherein the first inclination angle is inclusively between 2 and 20 degrees.

4. The vessel of claim 1 wherein the shape of the distal base is circular.

5. The vessel of claim 1 wherein the central axis is perpendicular to the distal base.

6. The vessel of claim 1 wherein the central axis is oblique to the distal base.

7. The vessel of claim 1 wherein the second inclination angle is variable for adapting to particulate stream conditions.

8. The vessel of claim 1 further comprising a lower discharge for discharging liquid and particulates.

9. The vessel of claim 8 wherein the lower discharge further comprises:
   an inlet valve adjacent and fluidly connected to the lower discharge;
   a particulate accumulation chamber; and
   a discharge valve, wherein
   the particulate accumulation chamber is sandwiched between the inlet valve and the discharge valve.

10. The vessel of claim 1 wherein the fluid inlet interface has a discharge end, and wherein the discharge end is oriented for discharging the gas stream into the freeboard portion at about the top inclination angle.

11. The vessel of claim 10 wherein the fluid inlet interface further comprises a replaceable nozzle having a discharge end oriented for discharging the gas stream into the freeboard portion.

12. The vessel of claim 11 wherein the gas stream emanates from a wellhead, and wherein the fluid inlet interface further comprises a receiving end orthogonal to the wellhead for receiving the gas stream.

13. A method for desanding a fluid stream emanating from a wellhead, the fluid stream containing gas, entrained liquid and particulates, the method comprising:
   providing an elongated vessel extending from a proximal end downwardly towards a distal end and having a diverging bounding wall to define a top inclination angle and a bottom inclination angle larger than the top inclination angle;
   injecting, at a first fluid velocity, the fluid stream into the vessel from the proximal end at about the first inclination angle;
   directing, at a second fluid velocity slower than said first fluid velocity, said fluid stream along an elongated flow path in the vessel from the proximal end towards the distal end to allow an effective amount of the particulates to fall out of the fluid stream and collect in a belly portion;
   collecting desanded gas in a freeboard portion, said freeboard portion being above the belly portion and being separated therefrom by a gas/liquid interface; and
   discharging the desanded gas from the freeboard portion at the distal end; wherein
   said desanded gas is free of a substantial portion of the particulates.

14. The method of claim 13 further comprising:
collecting particulates in the belly portion; and
discharging at least the collected particulates from the belly portion.

15. A vessel for removing particulates from a multiple-phase fluid stream containing at least gas and entrained particulates, the vessel comprising:
   a volume defined by a diverging bounding wall, a distal base, and apex having a proximal end; the diverging bounding wall having a top wall at a first inclination angle and a bottom wall at a second inclination angle; the second inclination angle being a greater angle than the first inclination angle;
   a fluid inlet at the proximal end;
   a fluid outlet on the top wall of the vessel and having an intake opening spaced from the fluid inlet;
   wherein the fluid inlet injects the fluid stream into the volume and directs the fluid stream along an elongated flow path from the fluid inlet towards the fluid outlet, to allow at least a portion of the entrained particulates fall out of the fluid stream and move into a lower portion of the volume, and to allow gas, collected in an upper portion of the volume in fluid communication with the intake opening of the fluid outlet, to be discharged via the fluid outlet.

16. The vessel of claim 15 wherein the multiple-phase fluid stream further comprises liquid, and wherein at least a portion of the liquid falls into the lower portion of the volume.

17. The vessel of claim 16 wherein the intake opening of the fluid outlet determines a horizontally extending freeboard interface, said freeboard interface separating the upper portion of the vessel above the interface and the lower portion therebelow, the upper portion forming a cross-sectional area for establishing a velocity of the fluid stream therein being slower than the fluid stream velocity at the fluid inlet.

18. The vessel of claim 17 wherein, at a steady state, the level of the liquid surface is at an elevation about the intake opening of the fluid outlet.

* * * * *